United States Patent
Gunawan et al.

(10) Patent No.: US 9,683,164 B2
(45) Date of Patent: Jun. 20, 2017

(54) METHOD OF USING SOPHOROLIPIDS OR MANNOSYLERYTHRITOL LIPIDS AS ACID CORROSION INHIBITORS IN WELL TREATMENT OPERATIONS

(71) Applicant: Baker Hughes Incorporated, Houston, TX (US)

(72) Inventors: Stanley Gunawan, Houston, TX (US); Mark A. Vorderbruggen, Spring, TX (US); Charles David Armstrong, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 131 days.

(21) Appl. No.: 14/683,983

(22) Filed: Apr. 10, 2015

(65) Prior Publication Data
US 2015/0299556 A1   Oct. 22, 2015

Related U.S. Application Data

(60) Provisional application No. 61/982,204, filed on Apr. 21, 2014.

(51) Int. Cl.
*C09K 8/54* (2006.01)
*C09K 8/035* (2006.01)
*C09K 8/528* (2006.01)
*C09K 8/74* (2006.01)

(52) U.S. Cl.
CPC ........... *C09K 8/54* (2013.01); *C09K 8/035* (2013.01); *C09K 8/528* (2013.01); *C09K 8/74* (2013.01); *C09K 2208/32* (2013.01)

(58) Field of Classification Search
None
See application file for complete search history.

(56) References Cited

U.S. PATENT DOCUMENTS

| 4,830,828 A * | 5/1989 | Anderson ............... C09K 8/54 210/698 |
| 2009/0221455 A1* | 9/2009 | Ke ........................ C09K 8/54 507/261 |

* cited by examiner

*Primary Examiner* — John J Figueroa
(74) *Attorney, Agent, or Firm* — Jones Delflache LLP; John Wilson Jones

(57) ABSTRACT

Corrosive effects arising during well treatment applications are inhibited and/or prevented by introducing into the well composition containing a corrosion inhibitor of a sophorolipid or a mannosylerythritol lipid or a combination thereof. The composition may also contain a corrosion inhibitor intensifier.

19 Claims, No Drawings

METHOD OF USING SOPHOROLIPIDS OR MANNOSYLERYTHRITOL LIPIDS AS ACID CORROSION INHIBITORS IN WELL TREATMENT OPERATIONS

This application claims the benefit of U.S. patent application Ser. No. 61/982,204, filed on Apr. 21, 2014.

SPECIFICATION

Field of the Disclosure

The disclosure relates generally to the reduction of corrosion of metal alloys used during well treatment operations.

Background of the Disclosure

Tubulars within a wellbore are exposed to highly corrosive acidic conditions. Depending on the types of treatments and the nature of formation damage, the aqueous acidic solution can be hydrochloric acid (HCl), hydrochloric-hydrofluoric mud acid (HCl-HF), organic acids such as acetic acid and formic acid as well as combinations thereof.

For instance, in well stimulation operations, such as pickling, acid washing, matrix acidizing and acid fracturing, an aqueous acidic solution may be applied to the production zone in order to increase the size of the pores within the formation penetrated by the well and to provide enlarged passageways for hydrocarbon, water or steam. Such solutions may also be introduced into the well in order remove formation damage during well completions or subsequent workovers.

Corrosion may also be caused by treatment fluids (such as drilling fluids and completion fluids) having a high salt content.

Corrosion of metallic surfaces during well treatment operations is thus a prominent issue, as evidenced by surface pitting, embrittlement and loss of metal. Corrosion is exacerbated by elevated temperatures and pressures encountered in deeper formations. The cost of repairing or replacing corrosion-damaged casing, tubing, and other equipment in the wellbore is extremely high.

Various corrosion inhibitors for diminishing the corrosive effects on metal surfaces have been developed and used previously in well treatment operations. The types of corrosion inhibitors vary depending upon the nature of the compositions, the types of metal surfaces involved, associated environmental conditions, and the like. In some prior attempts to reduce corrosion by using corrosion inhibitors, various problems exist, such as high toxicity ratings or not being environmentally friendly. Some prior art corrosion inhibitors are also cationic, which makes them incompatible with various other acid treatment additives, such as with anionic anti-sludge agents.

A need exists for new and useful compositions for inhibiting or preventing corrosion during well treatment operations with safer, less toxic, and more environmentally acceptable compositions. It is also desirable for the compositions to be compatible with other additives that are used in acid treatments.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improved compositions which inhibit corrosion and having one or more of the attributes or capabilities described or shown in, or as may be apparent from, the other portions of this patent.

SUMMARY OF THE DISCLOSURE

In an embodiment of the disclosure, a method of inhibiting corrosion during a well treatment operation is provided wherein a corrosive inhibiting effective amount of a sophorolipid or a mannosylerythritol lipid or a combination thereof is introduced into a well.

In another embodiment of the disclosure, a method of treating an alloy surface during a well treatment operation is provided wherein an alloy surface is contacted with a treatment fluid containing a sophorolipid or a mannosylerythritol lipid or a combination thereof. The amount of reduction in corrosion of the alloy surface is greater when the alloy surface is contacted with the corrosion inhibitor than when the alloy surface is only contacted with the aqueous acidic fluid.

In another embodiment of the disclosure, a method of inhibiting corrosion of a steel surface in contact with an acidic fluid during a well treatment operation is provided wherein the acidic fluid is contacted with a corrosion inhibitor and the steel surface is then contacted with the acidic fluid and corrosion inhibitor. The corrosion inhibitor may be a sophorolipid or a mannosylerythritol lipid or a combination thereof.

In another embodiment, a composition for use in the acid treatment of wells is provided which contains a corrosion inhibitor and a corrosion inhibitor intensifier in an acidic solution. The corrosion inhibitor may be a sophorolipid or a mannosylerythritol lipid or a combination thereof.

In an embodiment, the sophorolipids may be a mixture of acidic-form sophorolipids of formula (Ia), where the sophorolipids may be in the free acid form ($-R^3-COOH$); or acidic-form sophorolipids of formula (Ib), where the acidic-form sophorolipids may be in the neutralized form, as a salt or as a sophorolipid anion (as illustrated in formula (Ib) below) and associated cations (i.e. $NH_4^+$, $Na^+$, $K^+$, $Ca^{2+}$, $Mn^{2+}$, or $Fe^{3+}$, (typically $Na^+$ or $K^+$) that are distributed in the sophorolipid containing composition and n is 1, 2, or 3.

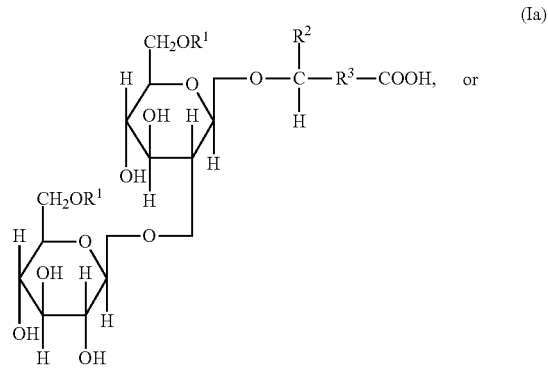

-continued

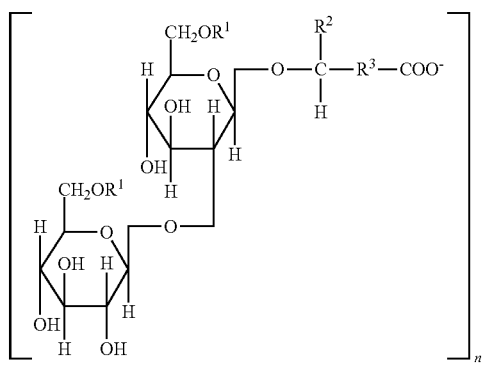
(Ib)

and ester-form sophorolipids of formulas either (IIa) or (IIb), or mixtures of (IIa) and (IIb), where these ester-form sophorolipids may be in the closed-ring form that may also be referred to as lactonic sophorolipids, or where the sophorolipids are in the open-ring form but the carboxyl acid moiety is esterified with, for example, a suitable alcohol or other hydroxyl-containing compound ($—R^3—COOR^4$, as an ester),

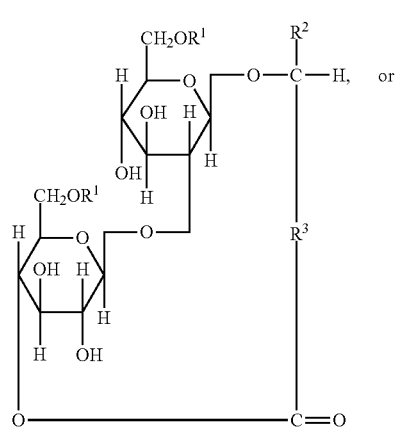
(Ib)

(IIb)

wherein $R^1$ is hydrogen, a $C_1$ to $C_4$ hydrocarbon or carboxylic acid group (typically an acetyl group); and either (i) $R^2$ is hydrogen or a $C_1$-$C_9$ saturated or unsaturated aliphatic group; and $R^3$ is a $C_7$-$C_{20}$ saturated or unsaturated aliphatic group; or (ii) $R^2$ is hydrogen or a methyl group and $R^3$ is a saturated or unsaturated hydrocarbon chain that contains from 7 to 20 carbon atoms. Typically $R^2$ is a hydrogen or methyl or ethyl group, (preferably a methyl group or hydrogen). Typically $R^3$ is $C_7$ to $C_{20}$ saturated or unsaturated aliphatic group a $C_7$ to $C_{20}$ (preferred is $C_{15}$ monounsaturated), and $R^4$ is hydrogen, $C_1$-$C_9$ saturated or unsaturated aliphatic group, monohydroxyl aliphatic group, or polyhydroxyl aliphatic group (preferred is hydrogen group).

In one embodiment, the sophorolipid is a mixture of sophorolipid compounds of the formulas (Ia) and (IIa) wherein $R^2$ is hydrogen or a $C_1$ to $C_4$ hydrocarbon (typically methyl).

In another embodiment, the sophorolipid is a mixture of acidic-form sophorolipids where at least portion of the acid moiety is neutralized with a base to form a salt or where the sophorolipid anion and associated cations of formula (Ib), as described above, are distributed in the sophorolipid containing composition, and ester-form sophorolipids as described in formulas (IIa) and (IIb). In yet another embodiment, all or any combination of the forms of the above describe sophorolipids may be in the composition.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. Also, the terms "including" and "comprising" are used herein and in the appended claims in an open-ended fashion, and thus should be interpreted to mean "including, but not limited to . . . ."

The disclosure provides methods and compositions useful for protecting alloy surfaces exposed to acid during the servicing of a well utilizing an effective corrosion inhibitor, optionally with a corrosion inhibitor intensifier. Such surfaces may include, but not be restricted to, acid tanks, acid pumping equipment, blenders, metal tubulars, coiled tubing, etc. As such, alloy surfaces are protected from acidic fluids by use of the composition disclosed herein.

The corrosion inhibitors defined herein have low toxicity and are biodegradable. They can thus replace conventional corrosion inhibitors that are less environmentally friendly since they are equally effective in reducing corrosion rates of metal alloy surfaces. In an aspect, the corrosion inhibitor reduces the corrosion rate of an alloy surface to less than about 0.050 lb/ft², and in some cases less than 0.02 lb/ft².

The compositions of the present disclosure also provide a novel solution for effectively reducing the toxicity and environmental impact of many acid well stimulation treatment fluids, such as those that use hydrochloric acid. As yet another advantage, the corrosion inhibitors in the disclosure may be applied in such environments where the use of cationic acid corrosion inhibitors causes an incompatibility problem with acid additives, such as anti-sludging agent.

The corrosion inhibitor for use in the disclosure may be a sophorolipid or a mannosylerythritol lipid or a combination thereof.

Suitable sophorolipids for use in the disclosure are those set forth in U.S. patent application Ser. No. 61/981,951 filed on Apr. 21, 2014 and U.S. patent application Ser. No. 61/981,964 filed on Apr. 21, 2014, both of which are herein incorporated by reference in their entirety.

In a preferred embodiment, the sophorolipid is a mixture of sophorolipidic compounds represented by the formulas (I) and (II):

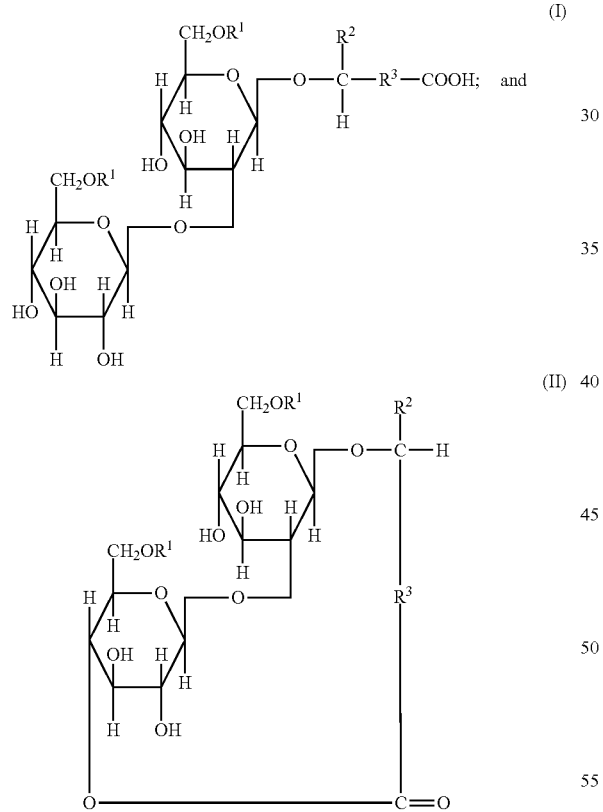

wherein $R^1$ is hydrogen or an acetyl group; and either $R^2$ is hydrogen or a $C_1$-$C_9$ saturated or unsaturated aliphatic group; and $R^3$ is a $C_7$-$C_{16}$ saturated or unsaturated aliphatic group; or $R^2$ is hydrogen or methyl and $R^3$ is a saturated or unsaturated hydrocarbon chain that contains from 12 to 18 carbon atoms, more preferably from about 13 to about 17 carbon atoms.

As illustrated, the hydroxyl fatty acid moiety of the acidic sophorolipids may remain a free acid (I) or form a macrocyclic lactone ring with the 4"-OH group of the sophorose lactone form (II). Such sophorolipidic compounds may be prepared by conventional methods known in the art, such as those disclosed in U.S. Pat. No. 5,879,913, herein incorporated by reference.

In an embodiment, the sophorolipid is a mixture of sophorolipidic compounds of the formulas (III) and (IV):

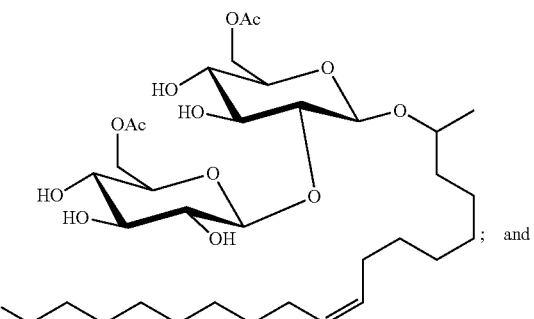

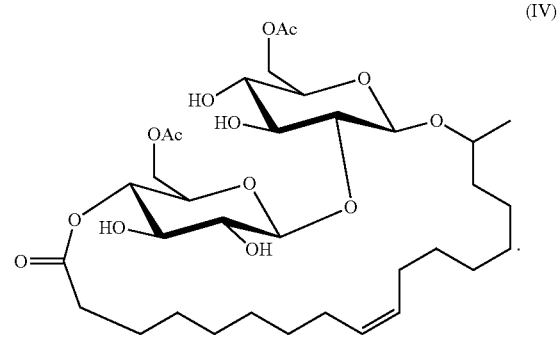

As described above, the sophorolipids may be a mixture of acidic-form sophorolipids of formula (Ia), where the sophorolipids may be in the free acid form (—$R^3$—COOH); or acidic-form sophorolipids of formula (Ib), where the acidic-form sophorolipids may be in the neutralized form, as a salt or as a sophorolipid anion (as illustrated in formula (Ib) below) and associated cations (i.e. $NH_4^+$, $Na^+$, $K^+$ $Ca^{2+}$, $Mn^{2+}$, or $Fe^{3+}$, typically $Na^+$ or $K^+$) that are distributed in the sophorolipid containing composition and n is 1, 2, or 3.

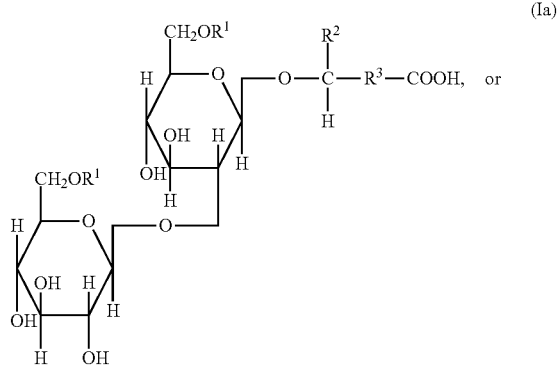

-continued

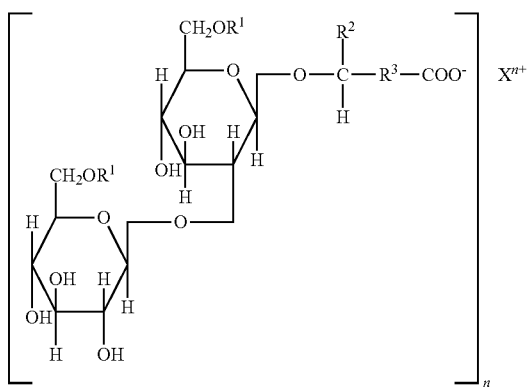
(Ib)

and ester-form sophorolipids of formulas either (IIa) or (IIb), or mixtures of (IIa) and (IIb), where these ester-form sophorolipids may be in the closed-ring form that may also be referred to as ester sophorolipids, or where the sophorolipids are in the open-ring form but the carboxyl acid moiety is esterified with, for example, a suitable alcohol or other hydroxyl-containing compound ($-R^3-COOR^4$, as an ester),

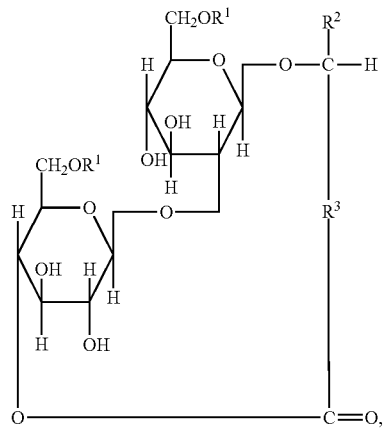
(IIa)

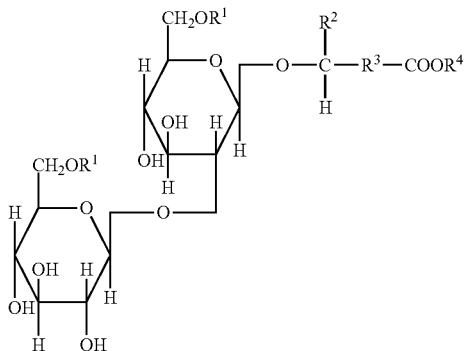
(IIb)

wherein $R^1$ is hydrogen, a $C_1$ to $C_4$ hydrocarbon or carboxylic acid group (typically an acetyl group); and either (i) $R^2$ is hydrogen or a $C_1$-$C_9$ saturated or unsaturated aliphatic group; and $R^3$ is a $C_7$-$C_{20}$ saturated or unsaturated aliphatic group; or (ii) $R^2$ is hydrogen or a methyl group and $R^3$ is a saturated or unsaturated hydrocarbon chain that contains from 7 to 20 carbon atoms. Typically $R^2$ is a hydrogen or methyl or ethyl group, (preferably a methyl group or hydrogen). Typically $R^3$ is $C_7$ to $C_{20}$ saturated or unsaturated aliphatic group a $C_7$ to $C_{20}$ (preferred is $C_{15}$ monounsaturated), and $R^4$ is hydrogen, $C_1$-$C_9$ saturated or unsaturated aliphatic group, monohydroxyl aliphatic group, or polyhydroxyl aliphatic group (preferred is hydrogen group). In one embodiment, the sophorolipid is a mixture of sophorolipids compounds of the formulas (Ia), (Ib), (IIa), and/or (IIb) wherein $R^2$ is hydrogen or methyl.

In another embodiment, the sophorolipid is a mixture of acidic-form sophorolipids where the acid moiety is at least partially neutralized with a base to form a salt or anion and cation distributed in the sophorolipid containing composition as described above, and ester-form sophorolipids where the carboxylic moiety is a lactone or an open chain ester-form sophorolipid (i.e. where the lactone ring is in open form but the acid moiety is esterified with a suitable hydroxyl containing compound such as, for example, glycerol or some other hydroxyl containing compound, such as mono- and poly-alcohols), or mixtures thereof. In yet another embodiment, all or any combination of the above describe sophorolipids may be in the composition.

The mannosylerythritol lipids for use herein as the corrosion inhibitor may consist of a fatty acid linked to 4-O-β-D-mannopyranosylerythritol or 1-O-β-D-mannopyranosylerythritol as the hydrophilic headgroup and may be represented by formula (V):

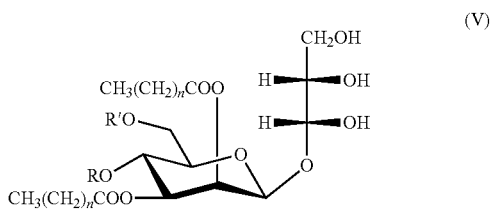
(V)

wherein R and $R^1$ are hydrogen or acetyl and n is from 6 to 10.

The corrosion inhibitors disclosed herein are especially useful in well treatment operations since the corrosive effect of acid on metal, in the presence of the inhibitor, is greatly minimized and in some cases prevented. The treated well may be a hydrocarbon producing well, such as a gas or oil well, or non-hydrocarbon producing wells, such as water injection wells, water producing wells or geothermal wells.

Exemplary metals include iron, ferrous base metals, alloys of steel, alloys of nickel, coiled tubing, corrosion resistant alloys, or duplex steels. Alloys of steel can include stainless steel, chrome steel, martensitic alloy steel, ferritic alloy steel, carbon steel, precipitation-hardened stainless steels and the like. Corrosion resistant alloys can also include chromium and the like. Other suitable types of alloy surfaces that the methods and compositions described herein can be used on will be apparent to those of skill in the art and are to be considered within the scope of the present disclosure.

The corrosion inhibitor introduced into the aqueous acid fluid may be from 4 to 100% active. In a preferred embodiment, the sophorolipid introduced into the aqueous acid fluid may be between 40 to 60% active, preferably about 50% active. The mannosylerythritol lipid introduced into the aqueous acid fluid is preferably between from about 95 to about 100% active.

The fluid containing the corrosion inhibitor may be introduced into various types of aqueous acidic fluids. For example, the aqueous acidic fluid can include hydrochloric acid, hydrochloric-hydrofluoric acid, acetic acid, formic acid, citric acid, phosphonic acid, methanesulfonic acid, or combinations thereof. Other types of acids that can be used in the aqueous acidic fluids will be apparent to those of skill in the art.

A corrosion inhibitor intensifier may also be included along with the corrosion inhibitor to boost the corrosion prevention power of the corrosion inhibitor, particularly at elevated temperatures. The use of the combined corrosion inhibitor and the optional corrosion inhibitor intensifier may substantially reduce the amount of corrosion and rate of corrosion experienced by the alloy surface compared to using the same fluid without the corrosion inhibitor alone or in combination with the corrosion inhibitor intensifier.

Suitable corrosion inhibitor intensifiers may include formic acid; formates such as sodium formate, potassium formate, methylformate and ethylformate; iodide containing materials such as metal iodides like sodium iodide, potassium iodide, copper iodide, molecular iodide, bismuth iodide; metal oxides as well as combinations thereof. Other suitable corrosion inhibitor intensifiers will be apparent to those of skill in the art and are to be considered within the scope of the present disclosure.

Besides the compositions described herein, other components commonly used in acidizing compositions may be used to broaden the range of applications in which the compositions defined herein may be used, so long as the components are compatible with the methods and compositions described herein. For example, mutual solvents or alcohols (such as methanol or isopropanol), surfactants, sequestering agents, friction reducers, iron control agents, non-emulsifiers, foaming agents, water-wetting surfactants, anti-sludge agents, gelling agents, bactericides, clay stabilizer or fluid loss control agents, and the like can be used in the present disclosure. The amount of such additives, when employed, is typically between from about 0.1 to about 2 weight percent. When mutual solvent or alcohols are employed, they are typically used in amounts between from about 1 to about 20 weight percent of the well treatment composition. Other suitable compatible components and amounts will be apparent to those of skill in the art and are to be considered within the scope of the present disclosure.

The corrosion inhibitors inhibit or prevent corrosion caused by aqueous acids and further reduce corrosion rates of various types of alloy surfaces. The aqueous acid may be composed of mineral acids, such as hydrochloric acid, hydrofluoric acid, sulfuric and phosphoric acids as well as weak acids, such as formic acid, acetic acid hydroxyacetic acid and propionic acid as well as mixtures of such acids.

The aqueous acidic fluid containing the corrosion inhibitor and, optionally, corrosion inhibitor intensifier, is typically introduced through the alloy surface or conduit positioned within the well. The amount of inhibitor introduced into the well may be dependent on the corrosive aqueous acid system, temperature and intended time of contact. In an aspect, the amount of corrosion inhibitor in the aqueous acidic fluid is between from about 0.1 vol. % to about 50 vol. %, preferably between from about 0.1 to about 15 vol. %. When the corrosion inhibitor intensifier is added to the composition, the composition can comprise about 2 pounds per thousand gallons (pptg) to about 100 pptg corrosion inhibitor intensifier; or alternatively, from about 5 pptg to about 35 pptg.

The corrosion inhibitor, and optionally corrosion inhibitor intensifier, can be used for various types of treatments for applications that occur in or before the wellbore and in subterranean formation applications. In an embodiment, the method may be performed by introducing an effective corrosion inhibiting or preventative amount of the inhibiting compound into a corrosive aqueous acid prior to its introduction into a targeted well.

The use of the corrosion inhibitor is particularly effective in the treatment of wells for enhancement of production of the well such as well stimulation processes like matrix acid stimulation and acid fracturing, acid tunneling, scale treatment, coiled tubing application, or damage removal. In another embodiment, the fluid is used during pickling a tubular.

In a preferred embodiment, the corrosion inhibitor may be used to effectively prevent corrosion during the acid treatment of wells, particularly at high temperatures. In such applications, the treatment provides enlarged passageways for hydrocarbons, water, or steam to move to collection points that would otherwise be obstructed. The fluid may be used in a wide variety of temperatures. In an aspect, for example, the corrosion inhibitor can be used in temperatures of up to about 225° F. For temperatures above 225° F., the corrosion inhibitor intensifier increases the corrosion prevention strength of the corrosion inhibitor. For temperatures that range from about 225° F. to about 350° F., the treatment fluid comprises the corrosion inhibitor and the corrosion inhibitor intensifier. The methods and compositions comprising both the corrosion inhibitor and the corrosion inhibitor intensifier are suitable for applications of up to about 350° F.

Other types of treatment applications that the methods and compositions described herein can be used will be apparent to those of skill in the art and are to be considered within the scope of the present disclosure.

All percentages set forth in the Examples are given in terms of volume units except as may otherwise be indicated.

EXAMPLES

Corrosion tests were performed at 175° F., 200° F. and 225° F. on two different types of steel, carbon steel (N-80) and 13% chromium steel (Cr-13). The acidic fluids tested were acetic acid, formic acid and HCl with KI. The results of the corrosion tests are shown in I-XVI. In each of the tests the acid solution was applied to the two different types of steel for six hours. The comparison runs did not use corrosion inhibitor or KI. Sophorolipids and mannosylerythritol lipids were tested with different acid systems (10% acetic acid, 10% formic acid, and 5-15% HCl) at 175° F.-250° F. for their efficacy as green acid corrosion inhibitors. The targeted corrosion rate is was <0.05 lb/sq ft.

As used below, the following abbreviations have been used:

CI-31, CI-111, CI-27: conventional corrosion inhibitors which are not environmentally friendly. CI-31 and CI-111 were used as acid corrosion inhibitor standards for organic acid experiments (10% acetic acid and 10% formic acid) and CI-27 was used as an acid corrosion inhibitor standard for 5-15% HCl experiments.

GL-10, a sophorolipid of Cargill Incorporated;

MEL, a mannosyleryhritol lipid;

M2414, an ethoxylated imidazoline commercially available from Baker Hughes Incorporated;

GL-10:M2414, a fluid comprising 25% active GL-10 and 25% active M2414);

The results are set forth in Tables I-XV:

TABLE I

10% Acetic Acid at 175° F. for 6 hours

| | Metal | Conversion Factor | Type |
|---|---|---|---|
| | 1 | N-80 | 0.0739 |
| | 2 | Cr-13 | 0.0709 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 1 | 100 | 12.05 | 1 | — | — | 38.9108 | 36.6633 | 0.1661 | Trace |
| 2 | 100 | 12.05 | 1 | GL-10 | 0.10% | 37.5485 | 37.4504 | 0.0068 | 0 |
| 3 | 100 | 12.05 | 1 | MEL | 0.50% | 36.6437 | 36.555 | 0.0066 | 0 |
| 4 | 100 | 12.05 | 1 | GL-10 + M2414 | 0.20% | 38.3268 | 38.2517 | 0.0056 | 0 |
| 5 | 100 | 12.05 | 1 | CI-31 | 0.50% | 37.1918 | 37.1361 | 0.0041 | 0 |
| 6 | 100 | 12.05 | 1 | CI-111 | 0.50% | 37.1028 | 37.039 | 0.0047 | 0 |
| Comp 7 | 100 | 12.05 | 2 | — | — | 39.5298 | 39.368 | 0.0115 | 0 |
| 8 | 100 | 12.05 | 2 | GL-10 | 0.10% | 40.2345 | 40.1284 | 0.0076 | 0 |
| 9 | 100 | 12.05 | 2 | MEL | 0.50% | 39.7104 | 39.5954 | 0.0081 | 0 |
| 10 | 100 | 12.05 | 2 | GL-10 + M2414 | 0.20% | 39.5224 | 39.4267 | 0.0068 | 0 |
| 11 | 100 | 12.05 | 2 | CI-31 | 0.50% | 37.9245 | 37.8702 | 0.0038 | 0 |
| 12 | 100 | 12.05 | 2 | CI-111 | 0.50% | 39.151 | 39.866 | 0.0035 | 0 |

TABLE II

10% Acetic Acid at 200° F. for 6 hours

| | Metal | Conversion Factor | Type |
|---|---|---|---|
| | 1 | Cr-13 | 0.0716 |
| | 2 | N-80 | 0.0738 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 13 | 100 | — | 1 | — | — | 39.5536 | 39.3671 | 0.0134 | 0 |
| 14 | 100 | 12.05 | 1 | GL-10 | 0.20% | 39.1957 | 39.0512 | 0.0103 | 0 |
| 15 | 100 | 12.05 | 1 | GL-10 | 0.50% | 38.8567 | 38.7368 | 0.0086 | 0 |
| 16 | 100 | 12.05 | 1 | MEL | 0.20% | 40.0192 | 39.8581 | 0.0115 | 0 |
| 17 | 100 | — | 1 | CI-31 | 0.20% | 38.6053 | 38.5193 | 0.0062 | 0 |
| 18 | 100 | — | 1 | CI-111 | 0.20% | 40.4387 | 40.3577 | 0.0058 | 0 |
| Comp 19 | 100 | — | 2 | — | — | 38.5817 | 34.8135 | 0.2781 | 0 |
| 20 | 100 | 12.05 | 2 | GL-10 | 2.00% | 38.9292 | 38.6839 | 0.0181 | 0 |
| 21 | 100 | 12.05 | 2 | MEL | 0.20% | 38.2253 | 37.9551 | 0.0199 | 1 |
| 22 | 100 | 12.05 | 2 | GI-10 + M2414 | 0.75% | 38.8768 | 38.7381 | 0.0102 | 0 |
| 23 | 100 | — | 2 | CI-31 | 0.20% | 38.1505 | 38.0483 | 0.0075 | 0 |
| 24 | 100 | — | 2 | CI-111 | 0.20% | 38.5402 | 38.481 | 0.0044 | 0 |

TABLE III

10% Acetic Acid at 225° F. for 6 hours

| | Metal | Conversion Factor | Type |
|---|---|---|---|
| | 1 | Cr-13 | 0.0713 |
| | 2 | N-80 | 0.0724 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 25 | 100 | — | 1 | — | — | 39.7549 | 39.3623 | 0.0280 | 0 |
| 26 | 100 | 12.05 | 1 | GL-10 + M2414 | 0.30% | 40.7811 | 40.5471 | 0.0167 | 0 |
| 27 | 100 | 12.05 | 1 | GL-10 + M2414 | 1.00% | 40.7002 | 40.5096 | 0.0136 | 0 |
| 28 | 100 | — | 1 | CI-31 | 0.30% | 39.6752 | 39.5626 | 0.0080 | 0 |
| 29 | 100 | — | 1 | CI-111 | 0.30% | 39.7496 | 39.6403 | 0.0078 | 0 |

TABLE III-continued

10% Acetic Acid at 225° F. for 6 hours

| Ex. | Volume | KI, mM | Metal | Inhibitor | Conc. | Initial | Final | Lbs/Sq Ft | Pitting |
|---|---|---|---|---|---|---|---|---|---|
| Comp 30 | 100 | — | 2 | — | — | 35.2498 | 32.0321 | 0.2331 | 1 |
| 31 | 100 | 12.05 | 2 | GL-10 + M2414 | 0.30% | 36.2903 | 36.1511 | 0.0101 | 0 |
| 32 | 100 | — | 2 | CI-31 | 0.30% | 38.2848 | 38.1788 | 0.0077 | 0 |
| 33 | 100 | — | 2 | CI-111 | 0.30% | 36.2213 | 36.0996 | 0.0088 | 0 |

TABLE IV

10% Formic Acid at 175° F. for 6 hours

| Metal | Type | Conversion Factor |
|---|---|---|
| 1 | N-80 | 0.0712 |
| 2 | Cr-13 | 0.0701 |

| | | | | | | Weights | | Corrosion Rate | |
|---|---|---|---|---|---|---|---|---|---|
| Ex. | Volume | KI, mM | Metal | Inhibitor | Conc. | Initial | Final | Lbs/Sq Ft | Pitting |
| Comp 34 | 100 | — | 1 | — | — | 36.7532 | 33.4711 | 0.2337 | 1 |
| 35 | 100 | 12.05 | 1 | GL-10 | 0.10% | 36.7966 | 36.4958 | 0.0215 | |
| 36 | 100 | 12.05 | 1 | GL-10 | 0.50% | 40.0845 | 39.9622 | 0.0087 | 0 |
| 37 | 100 | 12.05 | 1 | MEL | 0.50% | 37.8973 | 34.4903 | 0.2481 | 3 |
| 38 | 100 | 12.05 | 1 | MEL | 1.00% | 36.8896 | 35.3586 | 0.1115 | 2-3 |
| 39 | 100 | 24.10 | 1 | GL-10 + M2414 | 0.30% | 37.9192 | 37.833 | 0.0061 | 0 |
| 40 | 100 | — | 1 | CI-31 | 0.50% | 36.7947 | 36.5881 | 0.0147 | 0-Trace |
| 41 | 100 | — | 1 | CI-111 | 0.50% | 38.6615 | 38.5782 | 0.0059 | 0 |
| Comp 42 | 100 | — | 2 | — | — | 39.3884 | 35.4549 | 0.2757 | 0 |
| 43 | 100 | 12.05 | 2 | GL-10 | 0.50% | 41.0058 | 40.6444 | 0.0253 | 0 |
| 44 | 100 | 12.05 | 2 | GL-10 | 2.00% | 38.5968 | 38.3702 | 0.0159 | 0 |
| 45 | 100 | 12.05 | 2 | MEL | 1.00% | 39.8423 | 38.5537 | 0.0936 | 0 |
| 46 | 100 | 36.15 | 2 | GL-10 + M2414 | 0.30% | 41.1323 | 40.898 | 0.0164 | 0 |
| 47 | 100 | 36.15 | 2 | GL-10 + M2414 | 0.50% | 40.4267 | 40.2224 | 0.0143 | 0 |
| 48 | 100 | — | 2 | CI-31 | 0.50% | 39.6087 | 39.5001 | 0.0076 | 0 |
| 49 | 100 | — | 2 | CI-111 | 0.50% | 41.3135 | 41.211 | 0.0072 | 0 |

TABLE V

10% Formic Acid at 200° F. for 6 hours

| Metal | Type | Conversion Factor |
|---|---|---|
| 1 | Cr-13 | 0.0734 |
| 2 | N-80 | 0.0726 |

| | | | | | | Weights | | Corrosion Rate | |
|---|---|---|---|---|---|---|---|---|---|
| Ex. | Volume | KI, mM | Metal | Inhibitor | Conc. | Initial | Final | Lbs/Sq Ft | Pitting |
| Comp 50 | 100 | — | 1 | — | — | 40.4659 | 36.7608 | 0.2719 | 0 |
| 51 | 100 | 24.10 | 1 | GL-10 + M2414 | 1.00% | 40.588 | 39.4367 | 0.0845 | 0 |
| 52 | 100 | 24.10 | 1 | GL-10 + M2414 | 2.00% | 39.2714 | 38.2072 | 0.0781 | 0 |
| 53 | 100 | 24.10 | 1 | GL-10 + M2414 | 5.00% | 40.3997 | 39.2717 | 0.0828 | 0 |
| 54 | 100 | — | 1 | CI-31 | 0.20% | 38.3531 | 38.2556 | 0.0072 | 0 |
| 55 | 100 | — | 1 | CI-111 | 0.20% | 39.7314 | 39.6275 | 0.0076 | 0 |
| Comp 56 | 100 | — | 2 | — | — | 37.6268 | 32.1194 | 0.3998 | 1 |
| 57 | 100 | 24.10 | 2 | GL-10 + M2414 | 0.20% | 38.4102 | 38.1923 | 0.0158 | 1 |
| 58 | 100 | 24.10 | 2 | GL-10 + M2414 | 0.50% | 36.1961 | 36.1134 | 0.0060 | 2 |
| 59 | 100 | — | 2 | CI-31 | 0.20% | 38.9 | 36.528 | 0.1722 | 3-4 |
| 60 | 100 | — | 2 | CI-111 | 0.20% | 36.9876 | 36.8465 | 0.0102 | 0 |

TABLE VI

10% Formic Acid at 225° F. for 6 hours

| | | | | Metal | Conversion | Factor Type |
|---|---|---|---|---|---|---|
| | | | | 1 | Cr-13 | 0.0713 |
| | | | | 2 | N-80 | 0.0724 |

| Ex. | Volume | KI, mM | Metal | Inhibitor | Conc. | Initial (Weights) | Final (Weights) | Corrosion Rate Lbs/Sq Ft | Pitting |
|---|---|---|---|---|---|---|---|---|---|
| Comp 61 | 100 | — | 1 | — | — | 37.9425 | 34.5326 | 0.2431 | 0 |
| 62 | 100 | 36.15 | 1 | GL-10 + M2414 | 1.50% | 39.9571 | 38.6963 | 0.0899 | 0 |
| 63 | 100 | 36.15 | 1 | GL-10 + M2414 | 5.00% | 38.8325 | 37.57 | 0.0900 | 0 |
| 64 | 100 | — | 1 | CI-31 | 0.80% | 35.7851 | 35.6423 | 0.0102 | 0 |
| 65 | 100 | — | 1 | CI-111 | 0.80% | 38.9058 | 38.7986 | 0.0076 | 0 |
| Comp 66 | 100 | — | 2 | — | — | 37.1707 | 32.7946 | 0.3170 | 2 |
| 67 | 100 | 24.10 | 2 | GL-10 + M2414 | 0.30% | 38.835 | 38.6569 | 0.0129 | 0 |
| 68 | 100 | 24.10 | 2 | GL-10 + M2414 | 0.50% | 36.0056 | 35.8871 | 0.0086 | 0 |
| 69 | 100 | — | 2 | CI-31 | 0.30% | 38.0778 | 37.6015 | 0.0345 | 3 |
| 70 | 100 | — | 2 | CI-111 | 0.30% | 35.3916 | 35.2751 | 0.0084 | 0 |

TABLE VII

5% HCl at 175° F. for 6 hours

| | | | | Metal | Conversion | Factor Type |
|---|---|---|---|---|---|---|
| | | | | 1 | Cr-13 | 0.0703 |
| | | | | 2 | N-80 | 0.0746 |

| Ex. | Volume | KI, mM | Metal | Inhibitor | Conc. | Initial (Weights) | Final (Weights) | Corrosion Rate Lbs/Sq Ft | Pitting |
|---|---|---|---|---|---|---|---|---|---|
| Comp 71 | 100 | — | 1 | — | — | 41.779 | 36.9611 | 0.3385 | 0 |
| 72 | 100 | 12.05 | 1 | GL-10 | 0.50% | 41.5382 | 41.1119 | 0.0299 | 0 |
| 73 | 100 | 12.05 | 1 | MEL | 1.00% | 38.5793 | 38.2559 | 0.0227 | 0 |
| 74 | 100 | 12.05 | 1 | GL-10 + M2414 | 1.00% | 39.5508 | 39.4099 | 0.0099 | 0 |
| 75 | 100 | — | 1 | CI-27 | 0.20% | 39.4854 | 39.3927 | 0.0065 | 0 |
| Comp 76 | 100 | 48.2 | 2 | GL-10 + M2414 | 0.20% | 35.8952 | 35.5331 | 0.0270 | 0, 2-side |
| 77 | 100 | 48.2 | 2 | GL-10 + M2414 | 0.50% | 36.8182 | 36.6951 | 0.0092 | 0, 2-side |
| 78 | 100 | 48.2 | 2 | GL-10 + M2414 | 1.00% | 36.523 | 36.371 | 0.0113 | 0, 2-side |
| 79 | 100 | 48.2 | 2 | CI-27 | 0.20% | 41.1675 | 41.065 | 0.0076 | 0 |

TABLE VIII

5% HCl at 200° F. for 6 hours

| | | | | Metal | Conversion | Factor Type |
|---|---|---|---|---|---|---|
| | | | | 1 | Cr-13 | 0.0741 |
| | | | | 2 | N-80 | 0.0721 |

| Ex. | Volume | KI, mM | Metal | Inhibitor | Conc. | Initial (Weights) | Final (Weights) | Corrosion Rate Lbs/Sq Ft | Pitting |
|---|---|---|---|---|---|---|---|---|---|
| Comp 80 | 100 | — | 1 | — | — | 40.2373 | 35.5462 | 0.3475 | 2 |
| 81 | 100 | 36.15 | 1 | GL-10 + M2414 | 0.30% | 39.9064 | 39.6919 | 0.0159 | 0 |
| 82 | 100 | 36.15 | 1 | GL-10 + M2414 | 1.00% | 40.3549 | 40.126 | 0.0170 | 0 |
| 83 | 100 | — | 1 | CI-27 | 0.30% | 39.6685 | 39.5221 | 0.0108 | 0 |
| Comp 84 | 100 | — | 2 | — | — | 37.5418 | 33.1801 | 0.3145 | 2 |
| 85 | 100 | 48.2 | 2 | GL-10 + M2414 | 0.30% | 38.0458 | 37.6294 | 0.0300 | 2 |
| 86 | 100 | 48.2 | 2 | GL-10 + M2414 | 0.50% | 36.5407 | 36.1673 | 0.0269 | 1-2 |
| 87 | 100 | 48.2 | 2 | GL-10 + M2414 | 1.00% | 39.3476 | 39.1759 | 0.0124 | 0-1 |
| 88 | 100 | — | 2 | CI-27 | 0.30% | 36.5195 | 35.6619 | 0.0618 | 3-4 |

TABLE IX

5% HCl at 225° F. for 6 hours

| Metal | Conversion Factor | Type |
|---|---|---|
| 1 | Cr-13 | 0.0720 |
| 2 | N-80 | 0.0713 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 89 | 100 | — | 1 | — | — | 39.2825 | 35.8242 | 0.2491 | 2 |
| 90 | 100 | 48.2 | 1 | GL-10 + M2414 | 0.30% | 40.9103 | 40.4032 | 0.0365 | 0 |
| 91 | 100 | — | 1 | CI-27 | 0.30% | 38.7979 | 38.1629 | 0.0457 | 2.5-3 |
| Comp 92 | 100 | — | 2 | — | — | 37.5562 | 33.2611 | 0.3062 | 2 |
| 93 | 100 | 48.2 | 2 | GL-10 + M2414 | 0.60% | 36.9758 | 36.6699 | 0.0218 | 0 |
| 94 | 100 | — | 2 | CI-27 | 0.60% | 40.1993 | 39.6831 | 0.0368 | 3-4 |

TABLE X

10% HCl at 175° F. for 6 hours

| Metal | Conversion Factor | Type |
|---|---|---|
| 1 | Cr-13 | 0.0718 |
| 2 | N-80 | 0.0732 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 95 | 100 | — | 1 | — | — | 39.6889 | 33.0116 | 0.4794 | 0 |
| 96 | 100 | 12.05 | 1 | GL-10 | 1.00% | 40.6663 | 39.9202 | 0.0536 | 0 |
| 97 | 100 | 12.05 | 1 | MEL | 2.00% | 39.9305 | 39.2943 | 0.0457 | 0 |
| 98 | 100 | 48.2 | 1 | GL-10 + M2414 | 0.20% | 39.5803 | 39.4282 | 0.0109 | 0 |
| 99 | 100 | — | 1 | CI-27 | 0.20% | 41.1592 | 41.0216 | 0.0099 | 0 |
| 100 | 100 | 48.2 | 2 | GL-10 + M2414 | 0.20% | 36.2989 | 36.1269 | 0.0126 | 0 |

TABLE XI

10% HCl at 200° F. for 6 hours

| Metal | Conversion Factor | Type |
|---|---|---|
| 1 | Cr-13 | 0.0713 |
| 2 | N-80 | 0.0728 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 101 | 100 | — | 1 | — | — | 39.8315 | 30.7105 | 0.6502 | 2 |
| 102 | 100 | 36.15 | 1 | GL-10 + M2414 | 0.30% | 39.3664 | 38.8966 | 0.0335 | 0 |
| 103 | 100 | 36.15 | 1 | GL-10 + M2414 | 2.00% | 39.5694 | 39.0929 | 0.0340 | 0 |
| 104 | 100 | — | 1 | CI-27 | 0.30% | 40.2913 | 40.147 | 0.0103 | 0 |
| Comp 105 | 100 | — | 2 | — | — | 37.4938 | 29.9267 | 0.5509 | 3(edges) |
| 106 | 100 | 48.2 | 2 | GL-10 + M2414 | 0.30% | 37.2853 | 36.8576 | 0.0311 | 0 |
| 107 | 100 | 48.2 | 2 | GL-10 + M2414 | 1.00% | 35.89 | 35.4875 | 0.0293 | 0 |
| 108 | 100 | — | 2 | CI-27 | 0.30% | 39.8088 | 39.3113 | 0.0362 | 2 |

TABLE XII

10% HCl at 225° F. for 6 hours

| | Metal | Type | Conversion Factor |
|---|---|---|---|
| | 1 | Cr-13 | 0.0720 |
| | 2 | N-80 | 0.0713 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 109 | 100 | — | 1 | — | — | 40.052 | 33.7462 | 0.4543 | 1 |
| 110 | 100 | 48.2 | 1 | GL-10 + M2414 | 0.30% | 39.9069 | 39.0141 | 0.0643 | 0 |
| 111 | 100 | 48.2 | 1 | GL-10 + M2414 | 1.00% | 39.5502 | 38.5546 | 0.0717 | 0 |
| 112 | 100 | 48.2 | 1 | GL-10 + M2414 | 1.50% | 39.5185 | 38.5564 | 0.0693 | 0 |
| 113 | 100 | — | 1 | CI-27 | 0.30% | 40.2672 | 36.9573 | 0.2384 | 1-2 |
| Comp 114 | 100 | — | 1 | — | — | 38.3762 | 30.1376 | 0.5935 | Trace-1 |
| 115 | 100 | 48.2 | 1 | GL-10 + M2414 (37.5%:12.5%) | 0.75% | 37.014 | 36.3539 | 0.0476 | 0 |
| 116 | 100 | 48.2 | 1 | GL-10 + M2414 | 0.75% | 41.8352 | 40.8071 | 0.0741 | 1 |
| 117 | 100 | 48.2 | 1 | GL-10 + M2414 | 5.00% | 35.6027 | 34.3953 | 0.0870 | 0 |
| 118 | 100 | — | 1 | CI-27 | 0.75% | 35.8288 | 35.1453 | 0.0492 | 0 |

TABLE XIII

15% HCl at 175° F. for 6 hours

| | Metal | Type | Conversion Factor |
|---|---|---|---|
| | 1 | Cr-13 | 0.0725 |
| | 2 | N-80 | 0.0737 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 119 | 100 | — | 1 | — | — | 40.8853 | 28.6582 | 0.8866 | |
| 120 | 100 | 48.2 | 1 | GL-10 + M2414 | 2.00% | 40.0157 | 39.6524 | 0.0263 | 0 |
| 121 | 100 | — | 1 | CI-27 | 0.20% | 40.5058 | 40.3834 | 0.0089 | 0 |
| Comp 122 | 100 | — | 2 | — | — | 36.4085 | 28.7414 | 0.5653 | |
| 123 | 100 | 48.2 | 2 | GL-10 + M2414 | 2.00% | 36.3983 | 36.1346 | 0.0194 | 0 |
| 124 | 100 | — | 2 | CI-27 | 0.15% | 36.5296 | 36.341 | 0.0135 | 0 |

TABLE XIV

15% HCl at 200° F. for 6 hours

| | Metal | Type | Conversion Factor |
|---|---|---|---|
| | 1 | Cr-13 | 0.0718 |
| | 2 | N-80 | 0.0715 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 125 | 100 | — | 1 | — | — | 36.949 | 23.5816 | 0.9599 | 1 |
| 126 | 100 | 48.2 | 1 | GL-10 + M2414 | 0.75% | 35.9437 | 35.5823 | 0.0260 | 0 |
| 127 | 100 | — | 1 | CI-27 | 0.30% | 40.1695 | 40.0011 | 0.0121 | 0 |
| Comp 128 | 100 | — | 2 | — | — | 36.8795 | 23.2682 | 0.9732 | 3 |
| 129 | 100 | 36.15 | 2 | GL-10 + M2414 | 6.00% | 35.8811 | 35.3618 | 0.0371 | 0 |
| 130 | 100 | — | 2 | CI-27 | 0.40% | 35.8362 | 35.446 | 0.0279 | 2 |
| 131 | 100 | — | 2 | CI-31 | 0.40% | 36.4591 | 35.9143 | 0.0390 | 2 |

TABLE XV

| | | | 15% HCl at 225° F. for 6 hours | | | | | |
|---|---|---|---|---|---|---|---|---|
| | | | | | | Metal | Conversion Factor | Type |
| | | | | | | 1 | Cr-13 | 0.0695 |
| | | | | | | 2 | N-80 | 0.0746 |

| Ex. | Volume | KI, mM | Metal | Inhibitor | Conc. | Weights Initial | Weights Final | Corrosion Rate Lbs/Sq Ft | Pitting |
|---|---|---|---|---|---|---|---|---|---|
| Comp 132 | 100 | — | 1 | — | — | 36.2575 | 27.3559 | 0.6185 | 1 |
| 133 | 100 | 48.2 | 1 | GL-10 + M2414 (37.5%:12.5%) | 0.75% | 38.4984 | 37.5322 | 0.0671 | 0 |
| 134 | 100 | 48.2 | 1 | GL-10 + M2414 | 1.50% | 39.5232 | 38.5529 | 0.0674 | 0 |
| 135 | 100 | 48.2 | 1 | GL-10 + M2414 | 5.00% | 35.0385 | 34.2054 | 0.0579 | 0 |
| 136 | 100 | — | 1 | CI-27 | 0.75% | 36.8548 | 35.692 | 0.0808 | 1 |
| Comp 137 | 100 | — | 2 | — | — | 37.869 | 27.3568 | 0.7840 | 1 |
| 138 | 100 | 48.2 | 2 | GL-10 + M2414 (37.5%:12.5%) | 1.00% | 40.2622 | 38.919 | 0.1002 | 1 |
| 139 | 100 | 48.2 | 2 | GL-10 + M2414 | 1.50% | 40.5194 | 38.2066 | 0.1725 | 1 |
| 140 | 100 | 48.2 | 2 | GL-10 + M2414 | 5.00% | 38.528 | 36.908 | 0.1208 | 1 |
| 141 | 100 | — | 2 | CI-27 | 1.50% | 37.1089 | 36.9089 | 0.0149 | 0 |

As demonstrated in each of the tables, by applying the compositions and using the methods described herein, corrosion of various types of metals, such as carbon steel and alloy steel, in aqueous acidic solutions can be controlled. The results demonstrate the effectiveness of the corrosion inhibitors in the current disclosure and the synergistic effect achieved on corrosion inhibition when the corrosion inhibitor intensifier of the present disclosure is utilized. The industry acceptable level for corrosion rates is less than 0.050 lb/ft² during the life of treatment, i.e., acid contact time. As can be seen, all of the samples that used either the corrosion inhibitor alone at lower temperatures or in combination with the corrosion inhibitor at higher temperatures performed substantially better than the samples without any corrosion inhibitor and corrosion inhibitor intensifier and also substantially better than the acceptable industry standard of less than 0.050 lb/ft² for regular tubular.

From the foregoing, it will be observed that numerous variations and modifications may be effected without departing from the true spirit and scope of the novel concepts of the disclosure.

What is claimed is:

1. A method of inhibiting corrosion during a well treatment operation which comprises introducing into a well a composition comprising a corrosion inhibitor of at least one sophorolipidic compound selected from the group consisting of:

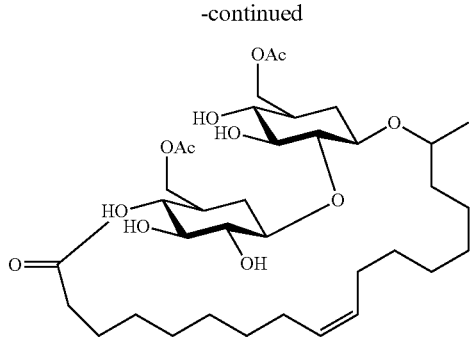

(I)

and (II)

or a mannosylerythritol lipid of the structural formula:

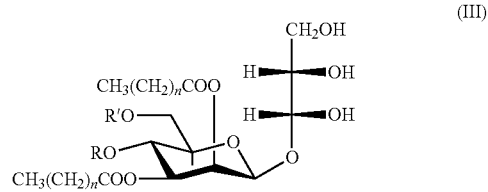

(III)

wherein R and R¹ are hydrogen or acetyl and n is from 6 to 10;

or a combination thereof.

2. The method of claim 1, wherein the corrosion inhibitor is at least one of the sophorolipidic compounds of the structural formula (I) or (II).

3. The method of claim 2, wherein (I) and (II) are in equilibrium with each other.

4. The method of claim 1, wherein the corrosion inhibitor is the mannosylerythritol lipid of the structural formula (III).

5. The method of claim 1, wherein the composition further comprises a corrosion inhibitor intensifier selected from the group consisting of formic acid, sodium formate, potassium formate, methylformate, ethylformate, iodide containing materials, metal oxides and combinations thereof.

6. The method of claim 5, wherein the corrosion inhibitor intensifier is selected from the group consisting of potassium iodide, sodium iodide, copper iodide, molecular iodide and bismuth iodide.

7. The method of claim 1, wherein the well treatment operation is a well stimulation process.

8. The method of claim 1, wherein the corrosion inhibitor is a mixture of the sophorolipidic compounds of the structural formula (I) and (II).

9. A method of treating an alloy surface during a well treatment operation comprising the step of contacting the alloy surface with a treatment fluid comprising an aqueous acidic fluid and a corrosion inhibitor selected from the group consisting of at least one sophorolipidic compound of the structural formula:

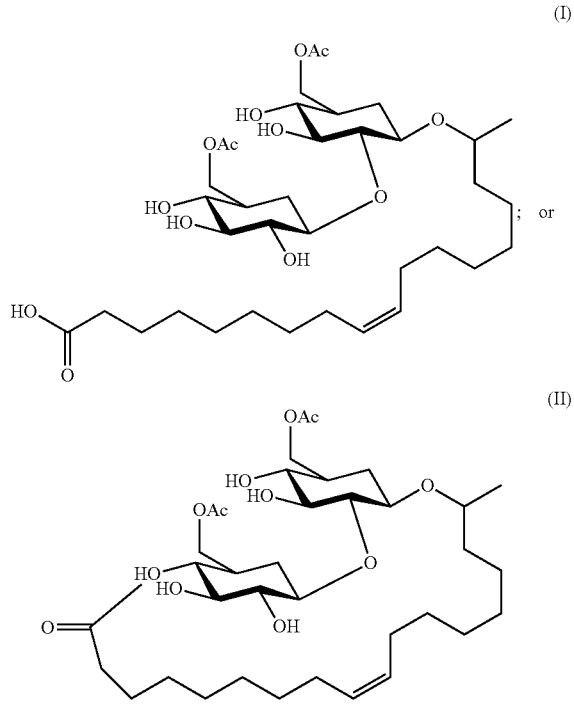

and a mannosylerythritol lipid of the structural formula:

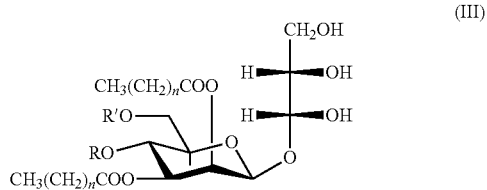

wherein R and $R^1$ are hydrogen or acetyl and n is from 6 to 10 or a combination thereof, wherein reduction in corrosion of the alloy surface is greater than when the alloy surface is only contacted with the aqueous acidic fluid.

10. The method of claim 9, wherein the corrosion inhibitor is a mannosylerythritol lipid of the structural formula (III).

11. The method of claim 9, wherein the corrosion inhibitor is at least one of the sophorolipidic compounds of structural formula (I) or (II).

12. The method of claim 9, wherein the corrosion inhibitor is a mixture of the sophorolipidic compounds of the structural formula (I) and (II).

13. A method of inhibiting corrosion of a steel surface in contact with an acidic fluid during a well treatment operation comprising the steps of:

(a) contacting the acidic fluid with a corrosion inhibitor of at least one sophorolipidic compound selected from the group consisting of:

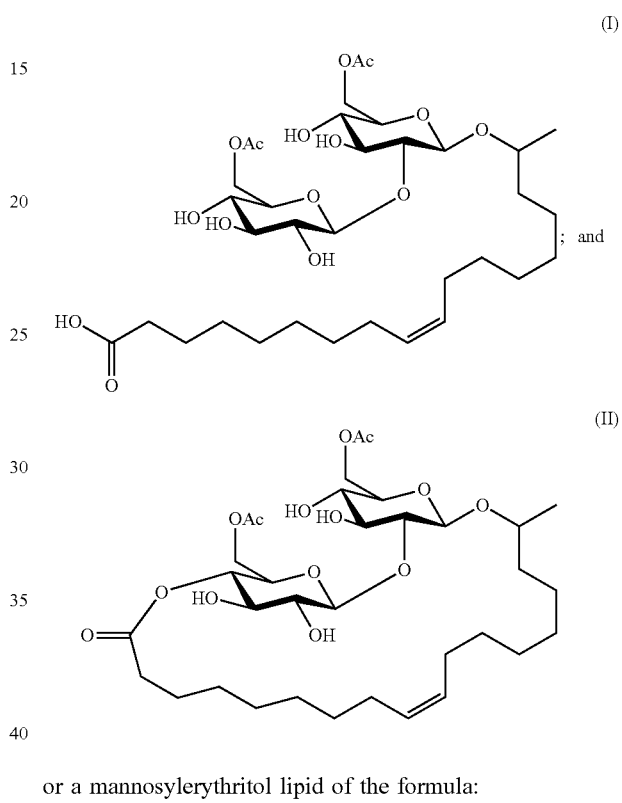

or a mannosylerythritol lipid of the formula:

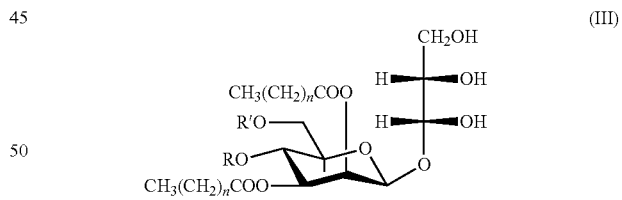

wherein R and $R^1$ are hydrogen or acetyl and n is from 6 to 10;

or a combination thereof; and (b) contacting the steel surface with the acidic fluid and the corrosion inhibitor.

14. The method of claim 13, wherein the step of contacting the steel surface with the acidic fluid and the corrosion inhibitor comprises pickling a tubular, cleaning a wellbore, matrix acid stimulation, acid fracturing, acid tunneling, scale treatment, coiled tubing application, or damage removal.

15. A composition for use in the acid treatment of wells, comprising:

(a) a corrosion inhibitor selected from the group consisting of at least one sophorolipidic compound of the structural formula:

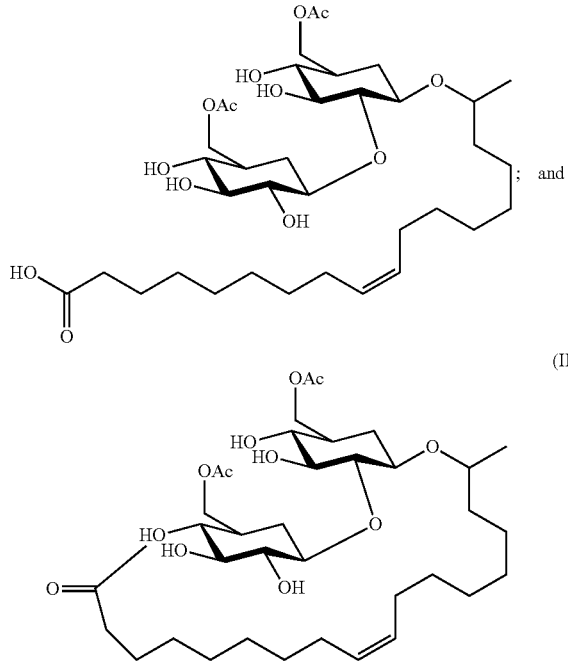

(I)

(II)

and a mannosylerythritol lipid of the structural formula:

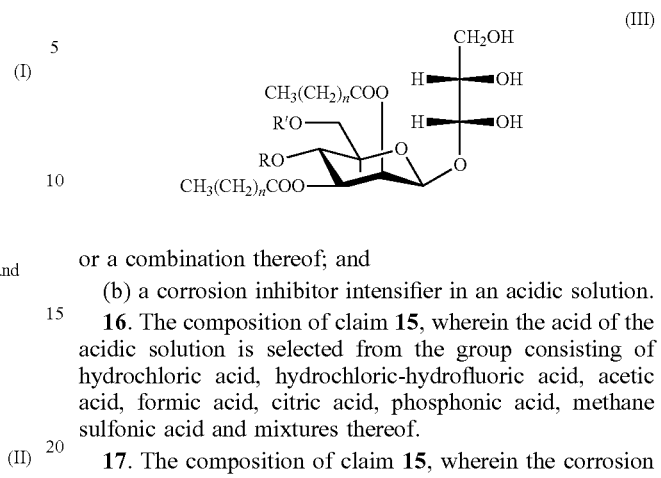

(III)

or a combination thereof; and (b) a corrosion inhibitor intensifier in an acidic solution.

16. The composition of claim 15, wherein the acid of the acidic solution is selected from the group consisting of hydrochloric acid, hydrochloric-hydrofluoric acid, acetic acid, formic acid, citric acid, phosphonic acid, methane sulfonic acid and mixtures thereof.

17. The composition of claim 15, wherein the corrosion inhibitor intensifier is selected from the group consisting of formic acid, sodium formate, potassium formate, methylformate, ethylformate, iodide containing materials, metal oxides, and combinations thereof.

18. The composition of claim 15, wherein the corrosion inhibitor is a mannosylerythritol lipid of the structural formula (III).

19. The method of claim 15, wherein the corrosion inhibitor is at least one of the sophorolipidic compounds of structural formula (I) or (II).

\* \* \* \* \*